(12) United States Patent
Ishikawa

(10) Patent No.: US 8,514,055 B2
(45) Date of Patent: Aug. 20, 2013

(54) VEHICLE FOR CARGO HANDLING

(75) Inventor: Naoki Ishikawa, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 473 days.

(21) Appl. No.: 12/682,222

(22) PCT Filed: Apr. 30, 2009

(86) PCT No.: PCT/JP2009/058798
§ 371 (c)(1),
(2), (4) Date: May 27, 2010

(87) PCT Pub. No.: WO2009/139360
PCT Pub. Date: Nov. 19, 2009

(65) Prior Publication Data
US 2010/0259359 A1    Oct. 14, 2010

(30) Foreign Application Priority Data

May 15, 2008  (JP) ................. 2008-128878

(51) Int. Cl.
*B60R 25/00* (2006.01)
*G05B 19/00* (2006.01)
*G06F 7/00* (2006.01)
*G08B 29/00* (2006.01)
*H04B 1/00* (2006.01)

(52) U.S. Cl.
USPC ............. 340/5.72; 340/5.1; 340/5.2; 340/5.7

(58) Field of Classification Search
USPC .................. 340/5.72, 5.1, 5.2, 5.7, 10.1, 5.6, 340/426; 307/10.4, 10.3; 701/22, 200, 123
See application file for complete search history.

(56) References Cited

U.S. PATENT DOCUMENTS

| | | | |
|---|---|---|---|
| 4,838,377 A | 6/1989 | Kozaki et al. | |
| 5,635,901 A * | 6/1997 | Weinblatt | 340/426.12 |
| 6,181,991 B1 * | 1/2001 | Kondo et al. | 701/22 |
| 6,856,878 B2 * | 2/2005 | Braunhardt et al. | 701/50 |
| 7,486,170 B2 * | 2/2009 | Kimura et al. | 340/5.72 |
| 2007/0126560 A1 * | 6/2007 | Seymour et al. | 340/426.1 |

FOREIGN PATENT DOCUMENTS

| | | |
|---|---|---|
| JP | 1-46329 A | 2/1989 |
| JP | 9-46329 A | 2/1997 |
| JP | 2003-63798 A | 3/2003 |
| JP | 2005-113572 A | 4/2005 |
| JP | 2006-76479 A | 3/2006 |
| JP | 2006-144595 A | 6/2006 |

(Continued)

*Primary Examiner* — Nam V Nguyen
(74) *Attorney, Agent, or Firm* — Birch, Stewart, Kolasch & Birch, LLP

(57) ABSTRACT

A vehicle for cargo handling is equipped with a storage unit for storing a password, a password input unit, and a control unit for controlling selection of a normal operating mode with no restrictions on travel capability or cargo handling capability, an emergency operating mode where at least the travel capability of the vehicle is restricted, and a travel prohibited mode where neither the normal operating mode nor the emergency operating mode is selected. The control unit determines whether password entry is required when the vehicle is powered on and controls selection of the normal operating mode when password entry is required or when a correct password is entered, the emergency operating mode when emergency operation is indicated, or the travel prohibited mode when the normal and emergency operating modes are not selected within a predetermined specific amount of time or within a specific number of times of operation.

19 Claims, 5 Drawing Sheets

(56) References Cited

FOREIGN PATENT DOCUMENTS

| JP | 2007-76455 A | 3/2007 |
| JP | 2008-17156 A | 1/2008 |
| JP | 2009-3827 A | 1/2009 |

* cited by examiner

VEHICLE FOR CARGO HANDLING

BACKGROUND OF THE INVENTION

1. Field of the Invention

The present invention relates to a vehicle for cargo handling such as a forklift or bulldozer, especially those equipped with a theft prevention mode and an emergency operating mode where at least the traveling capability of the vehicle is restricted while theft of the vehicle is prevented in the event of an emergency such as earthquake and fire.

2. Description of the Related Art

A vehicle for cargo handling such as a forklift or bulldozer is used in particular areas such as a factory or construction site and usually transported to a destination on a truck and it requires a special license to drive those vehicle, so there was little worry about theft of the vehicle even with the key attached. Moreover, it was common to leave the key in as a number of drivers usually take turn to drive this type of vehicle and as for a forklift, a driver who delivers cargos on his truck uses a forklift to unload the cargos at night.

However, recently theft of the cargo handling vehicles from factories or construction sites became noticeable. The vehicle is stolen on a truck and is used to destroy a building or equipment that is normally unbreakable. Thus, it is urgently needed to provide a theft prevention mode for the cargo handling vehicles.

Patent Reference 1 (JP64-46329A) discloses an electronic device to be loaded on a vehicle with a theft prevention function. The electronic device is equipped with a theft prevention mechanism having a normal operating mode wherein a normal operation of the vehicle is allowed in a state that the device is loaded in the vehicle, and a theft prevention mode wherein the normal operation of the vehicle is prohibited when the device is removed from the vehicle.

Moreover, for a forklift, vehicle characteristics such as operation of levers and response characteristics to operation amount and speed of levers and the like can be arbitrarily set for each driver. However, in the case of more than one operator driving the forklift, each operator has to reset vehicle characteristics every time. Patent Reference 2 (JP2003-63798A) provides an industrial vehicle in which each operator can input a password and operation of the forklift is allowed only when the password matches, and then vehicle characteristics corresponding to the entered password, is retrieved from a memory unit for solely storing characteristic data so as to operate the forklift according to the retrieved characteristic that matches the entered password.

As for a hydraulic shovel, a password is required to operate the vehicle and a monitor for password entry is also used for displaying information such as operation conditions. However, the monitor is installed inside an operator's room and activation of the monitor requires password entry and when changing the settings, password entry is required for each change, which increases workload for the operator. Therefore, Patent Reference 3 (JP2007-76455A) shows an operation vehicle equipped with a theft prevention device wherein when the power is on but the engine is still off, the information of the vehicle can be displayed on the display device without entering the password.

As described above, it is already known to use a password for theft prevention in vehicles such as a vehicle loaded with the electronic device (Patent Reference 1), industrial vehicle (Patent Reference 2) and the operation vehicle (Patent Reference 3), and especially a cargo-handling vehicle being operated by more than one operator. However, when the cargo-handling vehicle is parked in middle of the street for instance and the operator temporarily leaves the site, the vehicle cannot be moved without password entry although the key is in and this can cause an obstruction to other drivers. Also in the case of emergency such as earthquake or fire, the vehicle cannot be moved without password entry.

In view of this, an object of the present invention is to provide a cargo-handling vehicle such as forklift or a bulldozer which is operated by more than one operator, wherein limited operation of the vehicle such as moving the vehicle is allowed in the event of an emergency while theft of the vehicle is prevented even when the key is left in the vehicle.

SUMMARY OF THE INVENTION

To solve the problems above, a cargo-handling vehicle of the present invention comprises:
a memory unit which stores a normal mode password being set in advance;
a password entry unit;
an emergency mode indicating unit; and
a control unit which selects an operation mode of the vehicle according to a signal from the password entry unit or the emergency mode indicating unit,
wherein the control unit comprises an operation mode selection unit which selects an operation mode of the vehicle so that: a normal operating mode with no restrictions on travel capability or cargo handling capability is selected when a password that matches the normal mode password stored in the memory unit is entered from the password entry unit according to a request issued when the vehicle is powered on; an emergency operating mode where at least the traveling capability of the vehicle is restricted is selected upon receiving a prescribed operation signal from the emergency mode indicating unit; and a travel prohibited mode where at least traveling capability of the vehicle is prohibited is selected when neither the normal operating mode nor the emergency operating mode is selected within a predetermined specific amount of time or within a specific number of times of operation.

Furthermore, the present invention proposes a cargo-handling vehicle comprising:
a memory unit which stores a normal mode password being set in advance;
a password requirement switching device which switches between a password-necessary state and a password-unnecessary state;
a password entry unit;
an emergency mode indicating unit;
a control unit which selects an operation mode of the vehicle according to a state of the password requirement switching device and a signal from the password entry unit or the emergency mode indicating unit;
wherein the control unit comprises an operation mode selection unit which determines the state of the password requirement switching device when the vehicle is powered on and selects an operation mode of the vehicle in accordance with the determined state of the password requirement switching device so that: in a case of the password-necessary state, a normal operating mode with no restrictions on travel capability or cargo handling capability is selected when a password that matches the normal mode password stored in the memory unit is entered from the password entry unit according to a request issued; an emergency operating mode where at least the traveling capability of the vehicle is restricted is selected upon receiving a prescribed operation signal from the emergency mode indicating unit; and a travel prohibited mode where at least traveling capability of the vehicle is prohibited is selected when neither the normal operating mode nor the emergency operating mode is selected within a predetermined specific amount of time or within a specific number of times of operation; and in a case of the password-unnecessary state, the normal operation mode is selected at any time.

The cargo-handling vehicle of the present invention is unique in that the memory unit stores a second password for starting the emergency operating mode in advance, and the emergency mode indicating unit includes a password entry unit for entering the second password, and wherein the operation mode selection unit selects the emergency operating mode when the password entered from the password entry unit matches the second password.

The cargo-handling vehicle is also unique in that the password entry unit includes a touch panel that is provided integrally with a display unit of the vehicle, and the emergency mode indicating unit includes an emergency mode indicating area provided in the touch panel, and wherein the operation mode selection unit selects the emergency operating mode when the emergency mode indication area of the touch panel is touched.

It is preferable that the emergency mode indicating unit includes a switch installed in the vehicle for turning on and off the emergency operating mode, and wherein the operation mode selection unit selects the emergency operation mode according to a signal from the switch for indicating the emergency operating mode.

The cargo-handling vehicle of the present invention preferably further comprises a warning unit which is connected with the control unit and gives a warning in the emergency operating mode that at least the traveling capability of the vehicle is restricted.

It is also preferable that the operation mode selection unit selects the normal operating mode without requiring the password entry when the vehicle is powered on again within a predetermined time after stopping the normal operating mode which has started with the password entry.

As described above, the control unit comprises the operation mode selection unit which selects an operation mode of the vehicle among the normal operating mode, the emergency operating mode where at least the traveling capability of the vehicle is restricted and the travel prohibited mode so that legitimate drivers with a correct normal operating mode password can operate the vehicle in the normal operating mode. In the case of fire or emergency, with an input from the emergency mode indicating unit, any driver can operate the vehicle in the emergency operating mode where at least the traveling capability is restricted without knowing the normal operating mode password. In this manner, the normal operation of the vehicle is prohibited without entering the correct password, thereby diminishing the risk of being stolen and at the same time allowing anyone to move the vehicle temporarily at the time of an emergency. And the travel prohibited mode where at least traveling capability of the vehicle is prohibited, is selected when neither the normal operating mode nor the emergency operating mode is selected within a predetermined specific amount of time or within a specific number of times of operation. In this manner, the operation mode is changed among the three modes, and the cargo-handling vehicle with security and user-friendliness can be provided.

Moreover, by providing the password requirement switching device which switches between the password-necessary state and the password-unnecessary state, the password requirement and type (common password or individual password) can be selected depending on a situation. For instance, during the hours when workers are present at the site, the password-unnecessary state may be selected and when the workers are gone and a truck driver uses the vehicle for loading/unloading the cargos, the password-necessary state may be selected. The password necessary or unnecessary state can be chosen depending on the risk of the vehicle being stolen, thereby providing the cargo-handling vehicle with enhanced convenience.

Furthermore, the emergency mode indicating unit includes a touch panel or an emergency mode indicating switch provided in the vehicle. The emergency mode indicating unit may be a password entry unit and the emergency operating mode signal being sent when the password entered from the password entry unit matches the emergency operating mode password (the second password, e.g. common password). The emergency operating mode indicating device being the password entry unit, the emergency operating mode can be indicated without providing a separate switch or the like. The emergency operating mode indicating device being the touch panel already being provided integrally with the display unit, it can be an indicating unit without providing a separate switch. Even in the case of the touch panel not being provided, a function as a touch panel can be set in the display unit without providing a separate switch so that the operating mode can be switched to the emergency operating mode without requiring the password entry. And, when the emergency mode indicating unit is a switch installed in the vehicle for turning on and off the emergency operating mode, the operating mode can be switched to the emergency operating mode without requiring the password entry.

Furthermore, during the emergency operating mode, such a warning is give that at least the traveling capability of the vehicle is restricted, which helps the operator understand the driving status of the vehicle and also prompts the operator to drive accordingly. In the normal operating mode which has started with the correct password entry, the operator can drive the vehicle in the normal operating mode without entering the password when the vehicle is powered on again within a predetermined time after stopping the normal operating mode. For instance, if a cargo falls out of the truck during transporting cargos, the cargo-handling vehicle can be used for a short period of time without requiring the password entry, which eliminates the complication of entering the password.

DETAILED DESCRIPTION OF THE INVENTION

Figure 1:
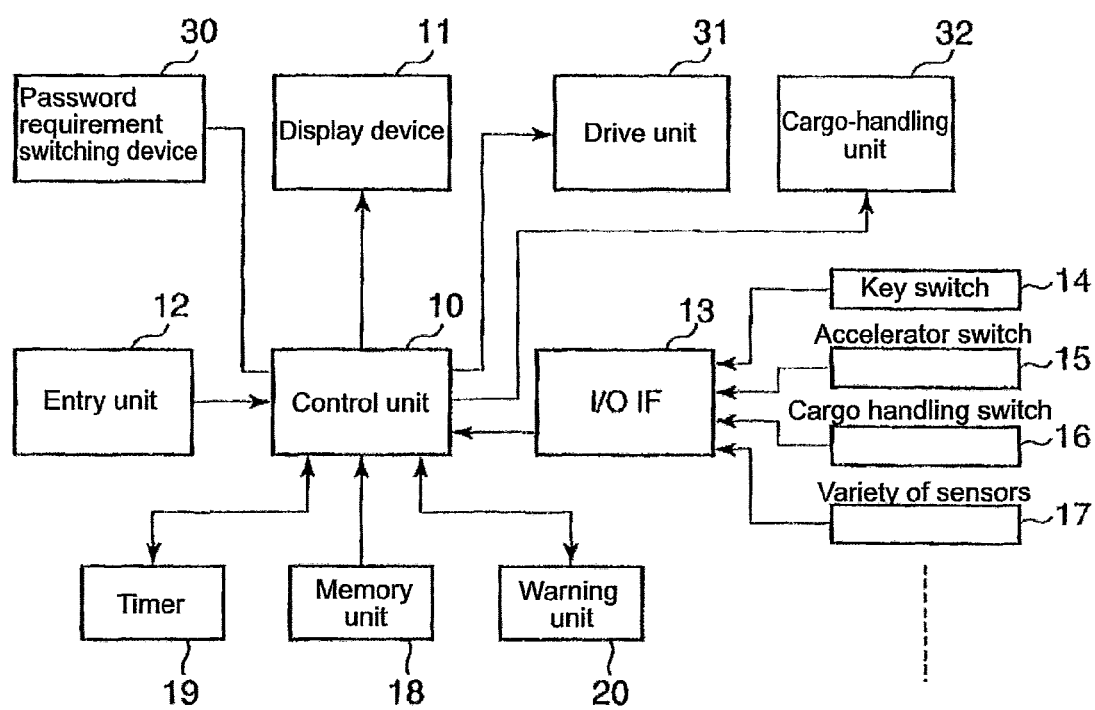
FIG. 1 is a control block diagram of the cargo-handling vehicle of the present invention.

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

[First Embodiment]

The general outline of the present invention is that the cargo-handling vehicle requires an operator to enter a password (password for operators, hereinafter referred to as a normal mode password) for theft prevention, and when the entered password matches a normal mode password being set in advance in the memory unit, the operator can use the vehicle in the normal operating mode with no restrictions on travel capacity or cargo handling capability.

In order to handle emergency situations when the vehicle is parked in the middle of the street with the operator being away temporarily and the cargo-handling vehicle cannot be moved without knowing the password, provided is the emergency operating mode which can be turned on by turning on an emergency operating mode indicating device without knowing the normal mode password. In the emergency operating mode, at least the traveling capability of the vehicle is restricted such as limitations on the speed or driving time, thereby diminishing the risk of being stolen and at the same time allowing anyone to move the vehicle in the time of emergency. This emergency operating mode may have restrictions on not only traveling capability but also cargo handling capability. For example, the restrictions can be made on rotation of the engine, supply of the fuel, use of acceleration pedal past a certain degree, and operating duration. And when the vehicle being electrically driven, the rotation speed of the motor can be restricted instead of the rotation speed of the engine.

Switching to the emergency operating mode can be done by touching the emergency mode indicating area provided in a touch panel in such case that the password entry unit is a touch panel being provided integrally with a display unit of the vehicle.

The password entry unit includes a touch panel that is provided integrally with a display unit of the vehicle, and the emergency mode indicating unit includes an emergency mode indicating area provided in the touch panel. It is also possible to use an operation panel or a switch provided on a part of the vehicle to indicate the switching to the emergency operating mode. The emergency mode password may be stored in the memory unit in advance and the vehicle being switched to the emergency operating mode when the correct emergency mode password is entered. When using the emergency mode password, the password may be shown in the display, or printed on a separate label and having the label put on the vehicle frame, or a password common to all the workers involved may be used (e.g. the whole telephone number of the workers).

When neither the normal operating mode nor emergency operating mode is selected within a predetermined specific amount of time or within a specific number of times of operation, the vehicle is switched to a travel prohibited mode where at least traveling capability of the vehicle is prohibited, for instance disabling a gear of the vehicle so as to prohibit forward/backward move of the vehicle, disabling the engine so that the vehicle is not turned on, or locking the parking break so that the parking break cannot be released.

In order to prohibit the activation of an engine of an engine forklift for an example, electric supply to a cell motor is stopped, a key switch being mechanically locked so that the key does not turn, and the fuel supply being stopped. The gear may be disabled by stopping the supply of electric power to an electro hydraulic valve for transmission, mechanically locking the shift lever, prohibiting the engaging of a forward/backward clutch, and bypassing the hydraulic circuit. In the case of a battery-operated forklift, the rotation speed of the motor can be restricted instead of the forward/backward gear. The present invention can be applied to both the engine powered forklift and battery powered forklift.

In this manner, the cargo-handling vehicle of the present invention can be operated in the normal operating mode by any legitimate operator who knows the correct password, and operated in the emergency operating mode by anyone without knowing the password so as to move the vehicle temporarily with restrictions on at least driving capability. When neither the normal operating mode nor the emergency operating mode is selected within a predetermined specific amount of time or within a specific number of times of operation, the travel prohibited mode is selected with restrictions on at least traveling capability, thereby diminishing the risk of the vehicle being stolen and enabling the operation in the time of emergency.

In the present invention, a password requirement switching device which switches between a password-necessary state and a password-unnecessary state is provided so that for instance, during the hours when workers are present at the site, the password-unnecessary state may be selected and when the works are gone and a truck driver uses the vehicle for loading/unloading the cargos, the password-necessary state may be selected. The password requirement switching device can be hardware such as a button provided in the vehicle, or software such as a password requirement switching area provided in the touch panel.

The password state can be decided depending on the risk of the vehicle being stolen, and thus the cargo-handling vehicle can be provided with enhanced convenience. In the password-unnecessary state the normal operating mode is selected, and in the password-necessary state, one of the three operating modes is selected. When the password requirement switching device is provided in the vehicle, the security level can be controlled, thereby enhancing the convenience. The password requirement switching device can be a terminal that service men carry around with. In that case, the password requirement setting can be overwritten by wired or wireless connection to the memory unit in the vehicle and the terminal. In this case, only certain people can switch the password requirement, which is good in terms of security.

Moreover, in the emergency operating mode where at least the traveling capability of the vehicle is restricted (restrictions on the driving speed or operation time), a warning about the restrictions is given to the operator in a form of a audio warning or display items in the display unit.

In the password-necessary mode, when a cargo falls off, the operator turns off the engine and power so as to pick up the cargo and he is required to enter the pass word again to start the vehicle, which is cumbersome to the operator and not very efficient. Therefore, in the present invention, the vehicle can be operated in the normal operating mode without requiring the password entry when the vehicle is powered on again within a predetermined time after stopping the normal operating mode (turning off the engine) which has started with the password entry so as to enhance the work efficiency.

Figure 5:
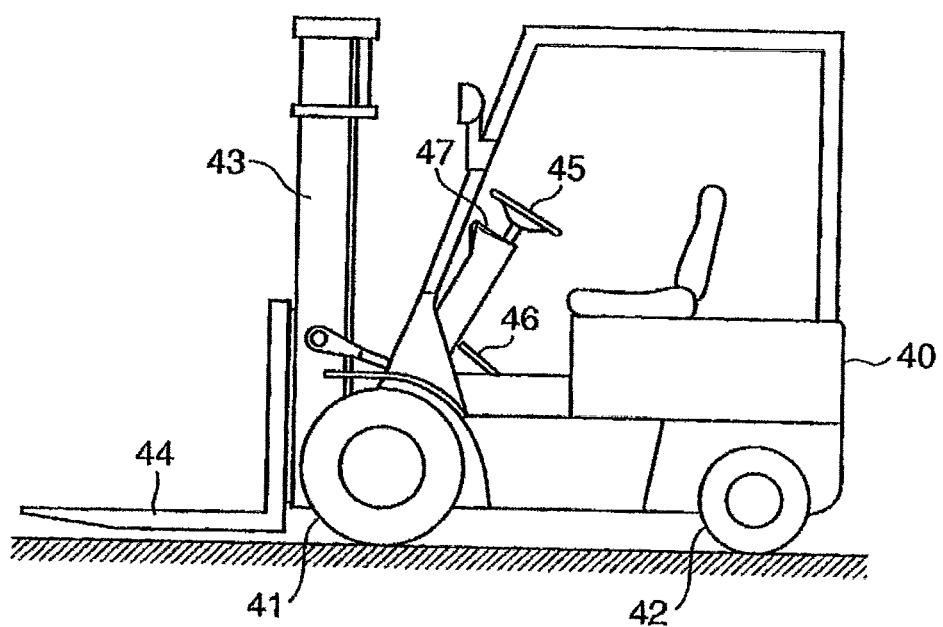
FIG. 5 is an example side view of a forklift as a cargo-handling vehicle.

Now with reference to FIG. 5 illustrating an example side view of a forklift as a cargo-handling vehicle, a schematic construction of the cargo-handling vehicle of the present invention will be explained hereinafter. The forklift shown in FIG. 5 has a body 40, a pair of front wheels 41 and a pair of rear wheels 42 being arranged under the body 40 on right and left sides thereof, a mast 43 at the fore of the body 40, and a fork 44 sticking out at the front of the mast 43. Both of the front wheels 41 are drive wheels and the rear wheels 42 are steered by the operator operating the steering wheel 45. The input from a power source (engine) is transmitted to a transmission and to a front axle so as to move the vehicle forward and backward by the front wheels 41.

The mast 43 is rotatably supported at its lower part to the body 40, being capable of tilting slightly forward and backward. The fork 44 directly supports the objects to be transported or unloaded, being capable of moving up and down along the mast 43 by operation of the operator.

A display device 47 is arranged near the steering wheel 45, where the operator can see and uses LCD to display fuel guage, traveling direction, water temperature gauge, hour meter, speed meter and so on. When the password entry is requested, the display device shows such message. In the forklift using the password setting, in correspondence to the selected operation mode from the normal operating mode with no restrictions on travel capability or cargo handling capability, the emergency operating mode where at least the traveling capability of the vehicle is restricted, upon receiving a prescribed operation signal from the emergency mode indicating unit or the emergency mode password, and the travel prohibited mode where at least traveling capability of the vehicle is prohibited when neither the normal operating mode nor the emergency operating mode is selected within a predetermined specific amount of time or within a specific number of times of operation. Moreover, when the display device is constructed with a touch panel or the like, the password entry can be done from the device as well.

Figure 3:
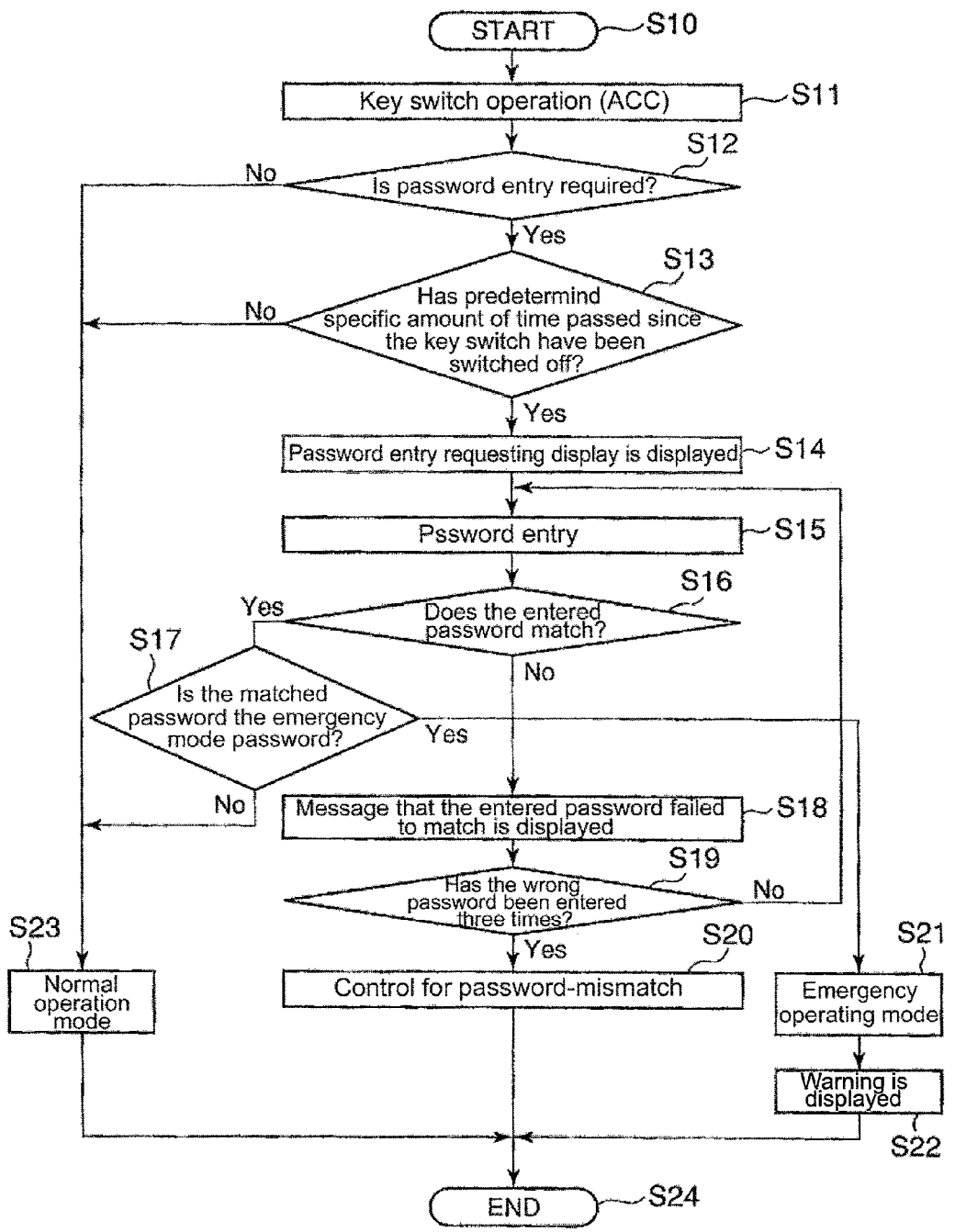
FIG. 3 is a flow chart of an example of operating the cargo-handling vehicle when switching to the emergency operating mode by entering the emergency mode password.
Figure 4:
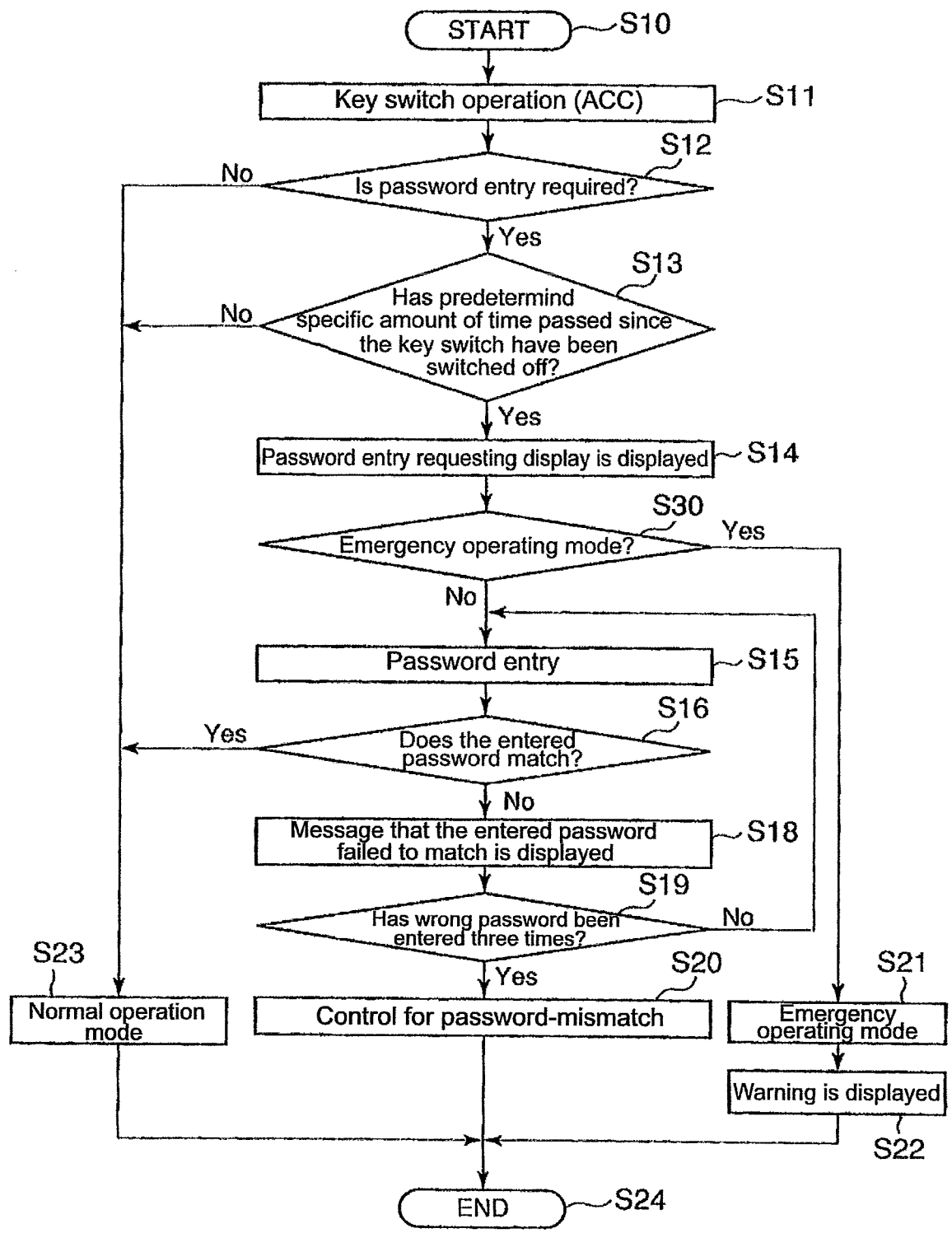
FIG. 4 is a flow chart of an example of operating the cargo-handling vehicle when switching to the emergency operating mode in the case of a emergency mode switch being provided in the cargo-handling vehicle.

FIG. 1 is a control block diagram of the cargo-handling vehicle of the present invention. FIG. 2 illustrates an example of a password entry display and the display showing the password entry in the emergency operating mode. FIG. 3 and FIG. 4 illustrate a flowchart of an example of operating the cargo-handling vehicle.

In FIG. 1, shown are a control unit 10 of the forklift 40, a display device 11 using LCD or the like, a password entry unit 12 which can be a numerical keypad or if the display device is constructed with a touch panel, the password can be inputted from the touch panel. Also shown are a key switch 14, an accelerator switch 15, a cargo-handling switch 16, a variety of sensors 17 such as a speed meter and a fuel guage, and I/O interface 13 for the key switch 14, accelerator switch 15, cargo-handling switch and other sensors 17. A memory unit 18 stores passwords therein and in the case of switching to the emergency operating mode by entering the emergency mode password, the normal mode password and emergency mode passwords are stored in the memory unit 18 in advance. On the other hand, in the case of switching to the emergency operating mode without requiring the password entry, only the normal operating mode password needs to be stored in the memory unit 18. FIG. 1 illustrates the case in which the emergency operating mode is activated by entering the emergency mode password, specifically the case in which the entry unit 12 functions as the password entry unit and the emergency mode indicating unit. For example, when using a switch such as a push button for the emergency mode indicating unit, an emergency mode indicating switch not shown in FIG. 1 needs to be provided. And when using a touch pane, the display device 11 can be constructed integrally with the entry unit 12.

19 is a timer for timing how long the engine or motor has been off since being turned off in the case of turning off the engine for a short period of time as described above so that the operator does not have to enter the password again. 20 is a warning unit which gives a warning in the emergency operating mode that the traveling capability of the vehicle is restricted. The warning unit may include a voice warning system, display items to be displayed in the display device 11, or a combination of display items and sound alarm such as buzzer. 31 is a drive unit for driving the wheels 41 shown in FIG. 5, which includes the engine, brake and transmission. 32 is a cargo-handling unit such as a hydraulic device for tilting the mast 43 and the fork together or for moving the fork 44 up and down along the mast 43. 30 is a password requirement switching device which switches between a password-necessary state and a password-unnecessary state as described above. As suggested hereinbefore, the password requirement switching device can be hardware such as a button provided on the vehicle. Or for example, the password requirement may be changed by entering a password for switching the password requirement state from the entry unit 12, or by push-and-holding number selection buttons 27, 28 and ENTER button 29 of the display device 11 together.

Figure 2A:
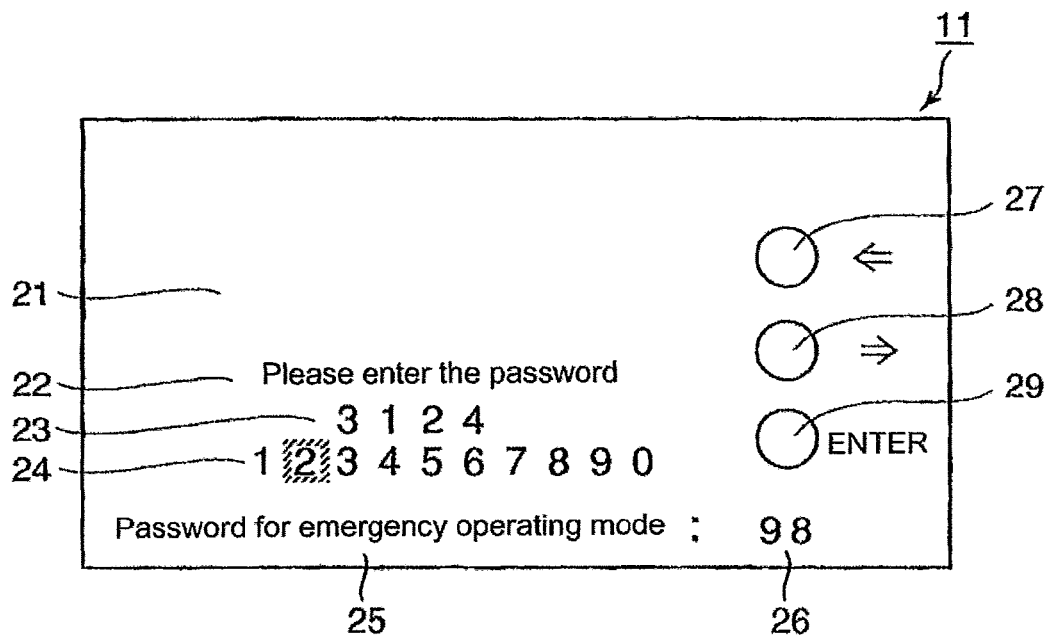
FIG. 2(A) and FIG. 2(B) illustrate an example of a password entry display and the display showing the password entry in the emergency operating mode.
Figure 2B:
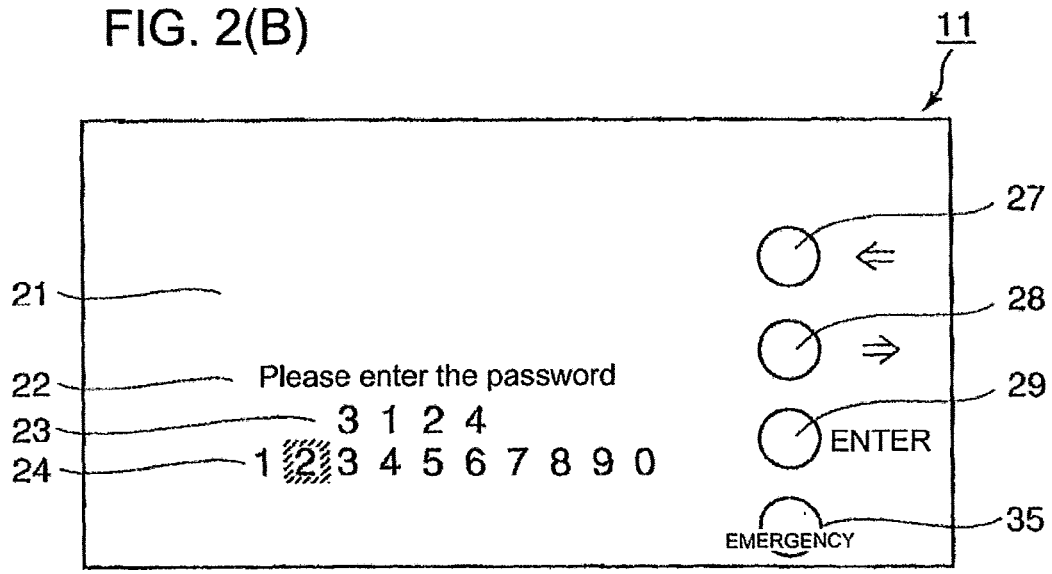

FIG. 2(A) and FIG. 2(B) illustrate an example of a password entry display in the display device 11. In FIG. 2 shown are a display window 21 using liquid crystal or the like, a password requirement message 22, a password having been entered 23, numerical display 24 for entering the password which for example can be used by moving a cursor with the number selection buttons 27, 28 and deciding with the ENTER button 29. If the password entry unit is constructed by the touch panel as mentioned above, the password can be entered by touching displayed numbers directly. Or a numerical keyboard can be provided for entering the password. The entered password is normally not displayed but shown in FIG. 2 for a better understanding.

In FIG. 2(A), a password display 25 displays that the emergency mode password 26 is "98" and the password "98" needs to be entered to start the emergency operating mode. The emergency mode password 26 may be displayed in the display device, changed as desired, saved as a memo in a pocked provided on a certain place of the vehicle, or posted somewhere on the vehicle. In FIG. 2(B), a emergency mode indicating area 35 is provided in the touch panel and the operation mode is switched to the emergency operating mode by touching the area.

In the case of switching to the emergency operating mode by entering the password, selection of the operation mode from the three modes can be made from the password entry unit 13, thereby achieving a compact construction. In the case of switching to the emergency operation mode by pushing the switch for starting the emergency operating mode or touching the emergency mode indicating area, the operation of switching the mode becomes easy to any operator in the event of an emergency.

Next, in reference to FIG. 3 and FIG. 4 showing flow charts of examples of operating the cargo-handling vehicle, the present invention will be described more. FIG. 3 is a flow chart of an example of operating the cargo-handling vehicle when switching to the emergency operating mode by entering the emergency mode password. FIG. 4 is a flow chart of an example of operating the cargo-handling vehicle when switching to the emergency operating mode in the case of the emergency mode switch or the emergency mode indicating area being provided in the cargo-handling vehicle. Both FIG. 3 and FIG. 4 are the flow charts having the password requirement switching device 30. When the password requirement switching device 30 is not provided, S12 should be omitted and skip to S13 from S11.

Once starting the operation (S10), the cargo-handling vehicle is powered on (ACC) with the key switch 14 of FIG. 1 (S11). First, the control unit 10 checks the state of the password requirement switching device 30 (S12). If the vehicle is located where the risk of theft is low or during the hours where many workers are present at the site, it is easier and more preferable to use only the key switch for staring the normal operating mode. Thus, the password requirement switching device 30 is provided, or the password requirement information is extracted from the memory unit where the password requirement information is stored.

If the password is not required, the normal operating mode is selected (S23). In the normal operating mode, there is no restriction on traveling capability or cargo-handling capability. Even in the password-unnecessary state, the password entry can always be requested instead of automatically moving to the step S23. In this case, the timer 19 may time and when a predetermined amount of time has passed, it may advance to the step S23, or even when the password entered and the normal mode password stored in the memory unit do not match, it may still advance to the step S23.

On the other hand, when it is determined in the step S12 that the password entry is necessary, in the case of the normal operating mode starting with the password entry the control unit 10 refers to the timer 19 to check whether or not the predetermined specific amount of time has passed since the key switch 14 having been turned off. If it is within the predetermined time, the process may advance to the step S23 without requiring the password entry again. If the entered password does not match the stored password, or it takes more than the predetermined time to enter the password, the display device 11 may display the message "Please enter the password" (S14) as shown in FIG. 2.

Next, in a step S15, the operator enters the password from the entry unit 12, the touch panel if the display device is the touch panel, or the numerical keyboard. And if the operation mode needs to be switched to the emergency operating mode, a button switch for instance in a shape of a mushroom or the like can be pushed instead of entering the password. This process will be explained later in reference to the flow chart of FIG. 4.

Now, in a next step S16, the control unit checks whether the entered password matches the normal mode password or emergency mode password having been stored in the memory unit 18 in advance. If the entered password matches the stored password, the process advances to a step S17. If the entered password matches neither of the normal mode password and emergency mode password, the process advances to a step S18 so as to display the message that the entered password fails to match, and further it is checked whether or not a wrong password has been entered three times in a step S19.

When the entered password does not match stored password, the process returns to the step S15 so as to direct the operator to enter the right password. If the operator keeps entering the wrong password, it is likely that someone other than a legitimate operator is attempting to operate the vehicle and thus how many times a wrong password has been entered is counted. For example, if a wrong password has been entered three times, it is determined that someone other than a legitimate operator is trying to operate the vehicle. Moreover, if it exceeds the predetermined period of time to enter a password, it is also determined that someone other than a legitimate operator is trying to operate the vehicle. Once it is determined that someone other than a legitimate operator is trying to operate the vehicle, the process advances to a step S20 wherein the control unit 10 sends such signal to the drive unit 31 and the cargo-handling unit 32 as a control for a password-mismatch so as to put restrictions on at least the traveling capability, for instance by not allowing the engine to be powered on, locking the parking brake, or not allowing the front/rear wheel crutch to fit by controlling a solenoid in hydraulic system of the transmission. As the control for the password-mismatch, not only the traveling capability but the cargo-handling capability can be restricted. It can be other than three times to start the password-mismatch control.

When the entered password matches the stored password and the process advances to the step S17, it is now determined whether the entered password matches the normal mode password or the emergency mode password. If it matches the emergency mode password, the process advances to a step S21. In the step S21, the normal operating mode with some restrictions is selected, in which the control unit 10 may send instructions to an engine controller to restrict the rotation speed of the drive unit 31 so as to lower the total output of the traveling and cargo-handling. Subsequently, in a step S22, in the emergency operating mode, the warning unit 20 gives a warning which the operator should be aware of in a form of a voice warning or display items in the display device 11 such that the rotation speed of the engine is lower than a normal speed, the operating time being set extremely lower than normal, the weight limit of cargos being restricted, or the height of the lift for lifting the cargo being restricted.

If the entered password does not match the emergency mode password, the normal operating mode with no restrictions on traveling capability or cargo-handling capability is selected. In the normal operating mode, once the key switch 14 is turned to an engine-start position, the engine starts and a normal operation of the vehicle by the accelerator switch 15, cargo-handling switch 16 and others can be started. Furthermore, The control unit 10 receives a single from a variety of sensors 17 via the I/O interface 13 so as to perform cargo-handling, and the display device 11 displays the speed meter, fuel gauge and so on. And once the operation is done, the key switch 14 is turned to an OFF position so as to stop the engine and finish the whole process.

The above-described process of switching to the emergency operating mode with the emergency mode password is illustrated in FIG. 3. Now the process of switching to the emergency operating mode with the emergency mode switch will be explained in reference to the flow chart of FIG. 4.

FIG. 4 illustrates the flow chart in which the operation mode is switched to the emergency operating mode by pushing a switch for starting the emergency mode or touching the emergency mode indicating area 35 in the touch panel as shown in FIG. 2(B). According to the process shown in FIG. 4, a step S30 after the step 14 for determining whether the signal for switching to the emergency operating mode is received from the emergency mode switch or emergency mode indicating area, is provided instead of the step S17 of FIG. 3 for determining whether the entered password matches the normal mode password or emergency mode password. The rest of the process which is the same as FIG. 3 is explained briefly below.

Once starting the operation (S10), the cargo-handling vehicle is powered on (ACC) with the key switch 14 of FIG. 1 (S11). First, the control unit 10 checks the state of the password requirement switching device 30 (S12). When it is determined that the password entry is unnecessary, the process advances to a step S23 so as to start the normal operating mode. As described above, the normal operating mode has no restrictions on traveling capability or cargo handling capability.

On the other hand, when it is found in the step S12 that the password entry is necessary, the control unit 10 refers to the timer 19 to check whether or not the normal mode has started with the password entry. If the normal operating mode has started with the password entry, it is checked whether the key switch 14 is turned on again within a predetermined time after turning off the key switch 14 previously. If it is within the predetermined time, it may advance to the step S23 without requiring the password entry again. If the entered password does not match the stored password, or it takes longer than the predetermined time, the display device 11 may display the message "Please enter the password" (S14) as shown in FIG. 2.

In the next step S30, it is determined if there are instructions to switch to the emergency operating mode from the emergency mode switch or the touch panel as shown in FIG. 2(B). If there are such instructions, the process advances to the step S21 so as to start the emergency operating mode and if there is not such instructions, the process advances to the step S15 in which the password is entered.

In the emergency operating mode, as described above the control unit 10 may send instructions to the engine controller in the drive unit 31 to regulate the rotation speed so as to lower the total output of the traveling and cargo-handling. Subsequently, in a step S22, in the emergency operating mode, the warning unit 20 gives a warning the operator should be away of, in a form of a voice warning or display items in the display device 11 such that the rotation speed of the engine is lower than a normal speed, the operating time being set extremely lower than usual, the weight limit of cargos being limited, or the height of the lift for lifting the cargo being restricted.

On the other hand, if the right password is entered and the process advances to the step S23, the normal operating mode with no restrictions on traveling capability or cargo-handling capability. In the normal operating mode, once the key switch 14 is turned to an engine-start position, the control unit 10 starts the engine and a normal operation of the vehicle by the accelerator switch 15, cargo-handling switch 16 and others can be started. Furthermore, the control unit 10 receives a signal from a variety of sensors 17 via the I/O interface 13 so as to perform cargo-handling, and the display device 11 displays the speed meter, fuel gauge and so on. And once the operation is done, the key switch 14 is turned to an OFF position so as to stop the engine and finish the whole process.

If a wrong password has been entered three times, it is determined that someone other than a legitimate operator is trying to operate the vehicle. As described hereinabove, if it exceeds the predetermined period of time to enter a password, it is also determined that someone other than a legitimate operator is trying to operate the vehicle. Once it is determined that someone other than a legitimate operator is trying to operate the vehicle, the process advances to the step S20 wherein the control unit 10 sends such signal to the drive unit 31 and the cargo-handling unit 32 as a control for a password-mismatch, for instance by not allowing the engine to be powered on, locking the parking break or not allowing the front/rear wheel crutch to fit so as to prohibit the traveling capability, or controlling a solenoid in hydraulic system of the transmission so that there is restrictions on the cargo-handling capability while the traveling capability is still available. It can be other than three times to start the password-mismatch control.

On the other hand, if the right password is entered and the process advances to the step S23, the normal operating mode with no restrictions on traveling capability or cargo-handling capability. In the normal operating mode, once the key switch 14 is turned to an engine-start position, the control unit 10 starts the engine and a normal operation of the vehicle by the accelerator switch 15, cargo-handling switch 16 and others can be started. Furthermore, the control unit 10 receives a single from a variety of sensors 17 via the I/O interface 13 so as to perform cargo-handling, and the display device 11 displays the speed meter, fuel gauge and so on. And once the operation is done, the key switch 14 is turned to an OFF position so as to stop the engine and finish the whole process.

As described above, according to the present invention, the emergency operating mode in which at least one of the traveling capability, cargo-handling capability and the operation time of the vehicle is restricted, is provided so that someone other than a legitimate operator can move the vehicle in spite of the restrictions when there is an earthquake or fire, or the vehicle is parked in middle of the street without the operator causing an obstruction. Therefore, the theft of the vehicle is still prevented while the vehicle is still movable in the event of an emergency.

Industrial Applicability

According to the present invention, the cargo-handling vehicle is constructed very convenient, in which the password setting is provided so as to prevent the theft of the vehicle and the emergency mode is provided as well so that the vehicle is movable when there is an earthquake or fire, or when the vehicle is parked in middle of the street causing an obstruction.

The invention claimed is:

1. A cargo-handling vehicle which is operated by more than one operator and equipped with a cargo-handling device such as a forklift, the vehicle comprising:
    a memory unit which stores, in advance, two passwords for a normal operating mode and an emergency operating mode;
    a password entry unit for entering a password after a key switch for starting a power source is turned ON; and
    a control unit which selects an operation mode of the vehicle according to a signal from the password entry unit,
    wherein the control unit includes, as operation modes of the vehicle:
        a normal operating mode with no restrictions on travel capability of the vehicle and cargo handling capability of the cargo-handling device;
        an emergency operating mode where the travelling capability of the vehicle and the cargo-handling capability of the cargo-handling device are restricted; and
        a travel prohibited mode where at least the travelling capability of the vehicle is prohibited,
    wherein the control unit selects an operation mode of the vehicle so that: the normal operating mode is selected when a normal mode password stored in the memory unit matches a password entered from the password entry unit in accordance with a request issued when the key switch is turned ON; the emergency operating mode is selected when the password entered from the password entry unit matches an emergency mode password stored in the memory unit; and the travel prohibited mode is selected when neither the normal operating mode nor the emergency operating mode is selected at least one of within a predetermined specific amount of time and within a specific number of times of entry operation of the password.

2. The cargo-handling vehicle according to claim 1,
    wherein the emergency mode password is
    visibly displayed in a display or at a predetermined place on the vehicle.

3. The cargo-handling vehicle according to claim 2,
    wherein the operation mode selection unit selects the normal operating mode without requiring the password entry when the vehicle is powered on again within a predetermined time after stopping the normal operating mode which has started with the password entry.

4. The cargo-handling vehicle according to claim 2, further comprising:
a warning unit which is connected with the control unit and gives a warning when selecting the emergency operating mode that about the restrictions on the traveling capability and the cargo handling capability of the cargo-handling device.

5. The cargo-handling vehicle according to claim 1,
wherein the password entry unit includes a touch panel that is provided integrally with a display unit of the vehicle, and the emergency mode indicating unit includes an emergency mode indicating area provided in the touch panel, and
wherein the operation mode selection unit selects the emergency operating mode when the emergency mode indication area of the touch panel is touched.

6. The cargo-handling vehicle according to claim 5, further comprising:
a warning unit which is connected with the control unit and gives a warning when selecting the emergency operating mode that about the restrictions on the traveling capability and the cargo handling capability of the cargo-handling device.

7. The cargo-handling vehicle according to claim 5,
wherein the operation mode selection unit selects the normal operating mode without requiring the password entry when the vehicle is powered on again within a predetermined time after stopping the normal operating mode which has started with the password entry.

8. The cargo-handling vehicle according to claim 1,
wherein the emergency mode indicating unit includes a switch installed in the vehicle for turning on and off the emergency operating mode, and
wherein the operation mode selection unit selects the emergency operation mode according to a signal from the switch for indicating the emergency operating mode.

9. The cargo-handling vehicle according to claim 1, further comprising:
a warning unit which is connected with the control unit and gives a warning when selecting the emergency operating mode that about the restrictions on the traveling capability and the cargo handling capability of the cargo-handling device.

10. The cargo-handling vehicle according to claim 1,
wherein the operation mode selection unit selects the normal operating mode without requiring the password entry when the vehicle is powered on again within a predetermined time after stopping the normal operating mode which has started with the password entry.

11. A cargo-handling vehicle which is operated by more than one operator and equipped with a cargo-handling device such as a forklift, the vehicle comprising:
a memory unit which stores, in advance, two passwords for a normal operating mode and an emergency mode;
a password requirement switching device which switches between a password-necessary state and a password-unnecessary state;
a password entry unit for entering a password after a key switch for starting a power source is turned ON; and
a control unit which selects an operation mode of the vehicle according to a state of the password requirement switching device and a signal from the password entry unit;
wherein the control unit includes, as operation modes of the vehicle:
a normal operating mode with no restrictions on travel capability of the vehicle and cargo handling capability of the cargo-handling device;
an emergency operating mode where the travelling capability of the vehicle and the cargo-handling capability of the cargo-handling device are restricted; and
a travel prohibited mode where at least the travelling capability of the vehicle is prohibited,
wherein the control unit determines the state of the password requirement switching device when the key switch is turned ON and selects an operation mode of the vehicle in accordance with the determined state of the password requirement switching device so that: in a case of the password-necessary state, the normal operating mode is selected when a normal mode password stored in the memory unit matches a password entered from the password entry unit in accordance with a request issued; the emergency operating mode is selected when the password entered from the password entry unit matches an emergency mode password stored in the memory unit; and the travel prohibited mode is selected when neither the normal operating mode nor the emergency operating mode is selected within a predetermined specific amount of time or within a specific number of times of entry operation of the password; and in a case of the password-unnecessary state, the normal operation mode is selected at any time.

12. The cargo-handling vehicle according to claim 11,
wherein the emergency mode password is
visibly displayed in a display or at a predetermined place on the vehicle or a common password known to the operators.

13. The cargo-handling vehicle according to claim 12, further comprising:
a warning unit which is connected with the control unit and gives a warning when selecting the emergency operating mode that about the restrictions on the traveling capability and the cargo handling capability of the cargo-handling device.

14. The cargo-handling vehicle according to claim 12,
wherein the operation mode selection unit selects the normal operating mode without requiring the password entry when the vehicle is powered on again within a predetermined time after stopping the normal operating mode which has started with the password entry.

15. The cargo-handling vehicle according to claim 11,
wherein the password entry unit includes a touch panel that is provided integrally with a display unit of the vehicle, and the emergency mode indicating unit includes an emergency mode indicating area provided in the touch panel, and
wherein the operation mode selection unit selects the emergency operating mode when the emergency mode indication area of the touch panel is touched.

16. The cargo-handling vehicle according to claim 15,
wherein the operation mode selection unit selects the normal operating mode without requiring the password entry when the vehicle is powered on again within a predetermined time after stopping the normal operating mode which has started with the password entry.

17. The cargo-handling vehicle according to claim 11,
wherein the emergency mode indicating unit includes a switch installed in the vehicle for turning on and off the emergency operating mode, and
wherein the operation mode selection unit selects the emergency operation mode according to a signal from the switch for indicating the emergency operating mode.

18. The cargo-handling vehicle according to claim 11, further comprising:
a warning unit which is connected with the control unit and gives a warning when selecting the emergency operating mode that about the restrictions on the traveling capability and the cargo handling capability of the cargo-handling device.

19. The cargo-handling vehicle according to claim 11, wherein the operation mode selection unit selects the normal operating mode without requiring the password entry when the vehicle is powered on again within a predetermined time after stopping the normal operating mode which has started with the password entry.

\* \* \* \* \*